March 7, 1939.  J. D. LEWIS ET AL  2,149,452
ELEVATOR CONTROL MECHANISM
Filed Dec. 18, 1937  4 Sheets-Sheet 3
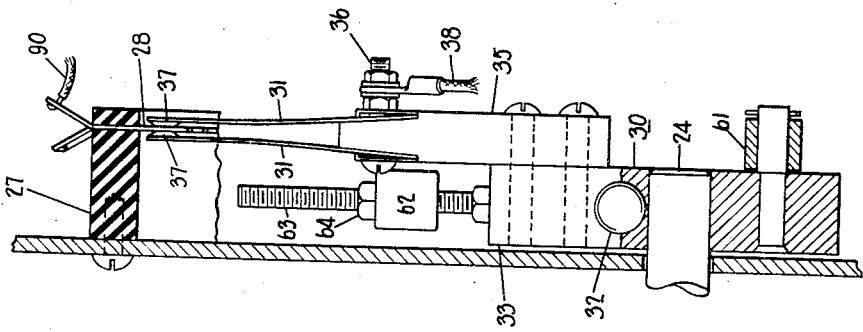
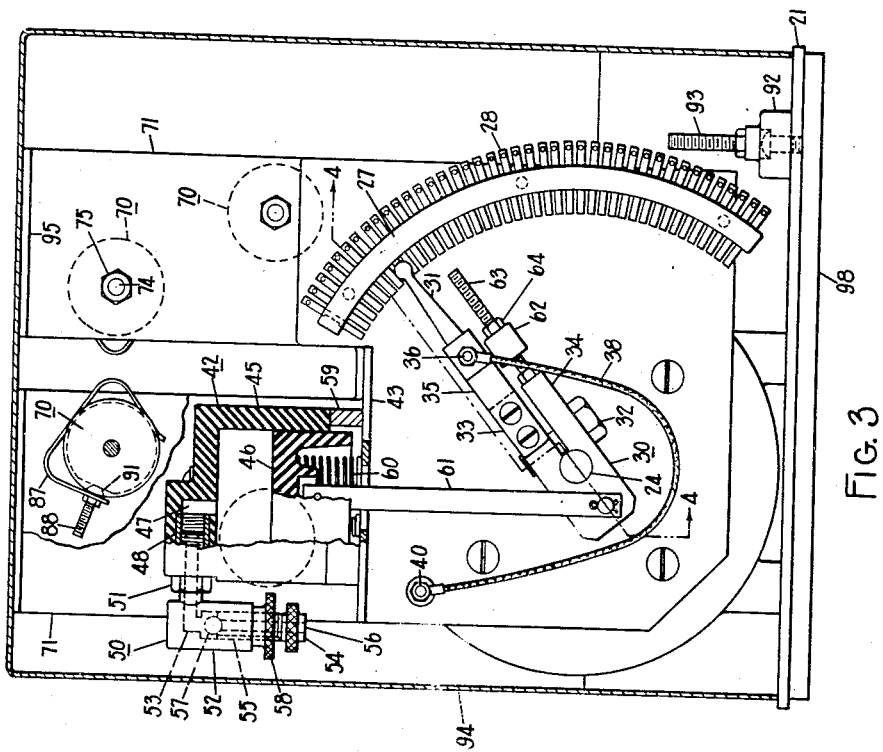
Jacob Daniel Lewis
Otto Albert Kraus } INVENTORS
BY Walter E. Bradley  ATTORNEY

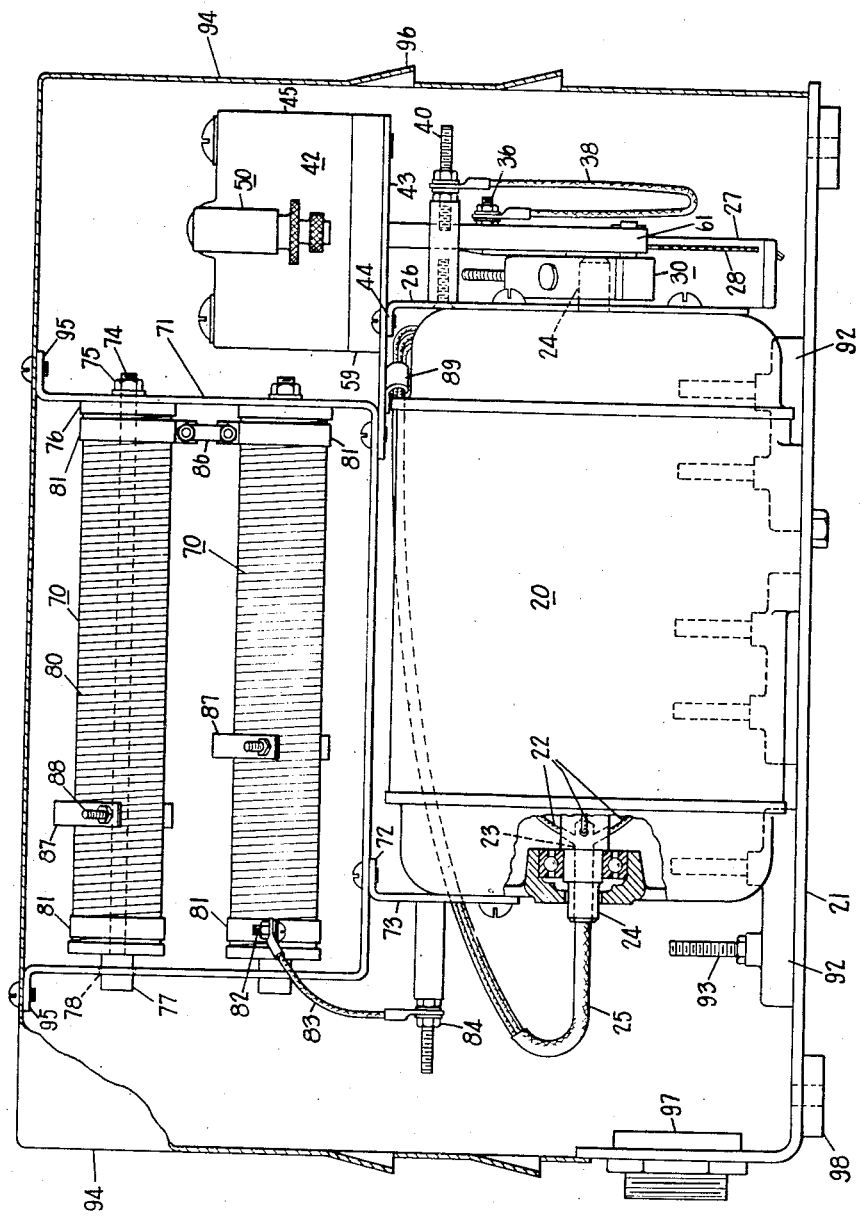

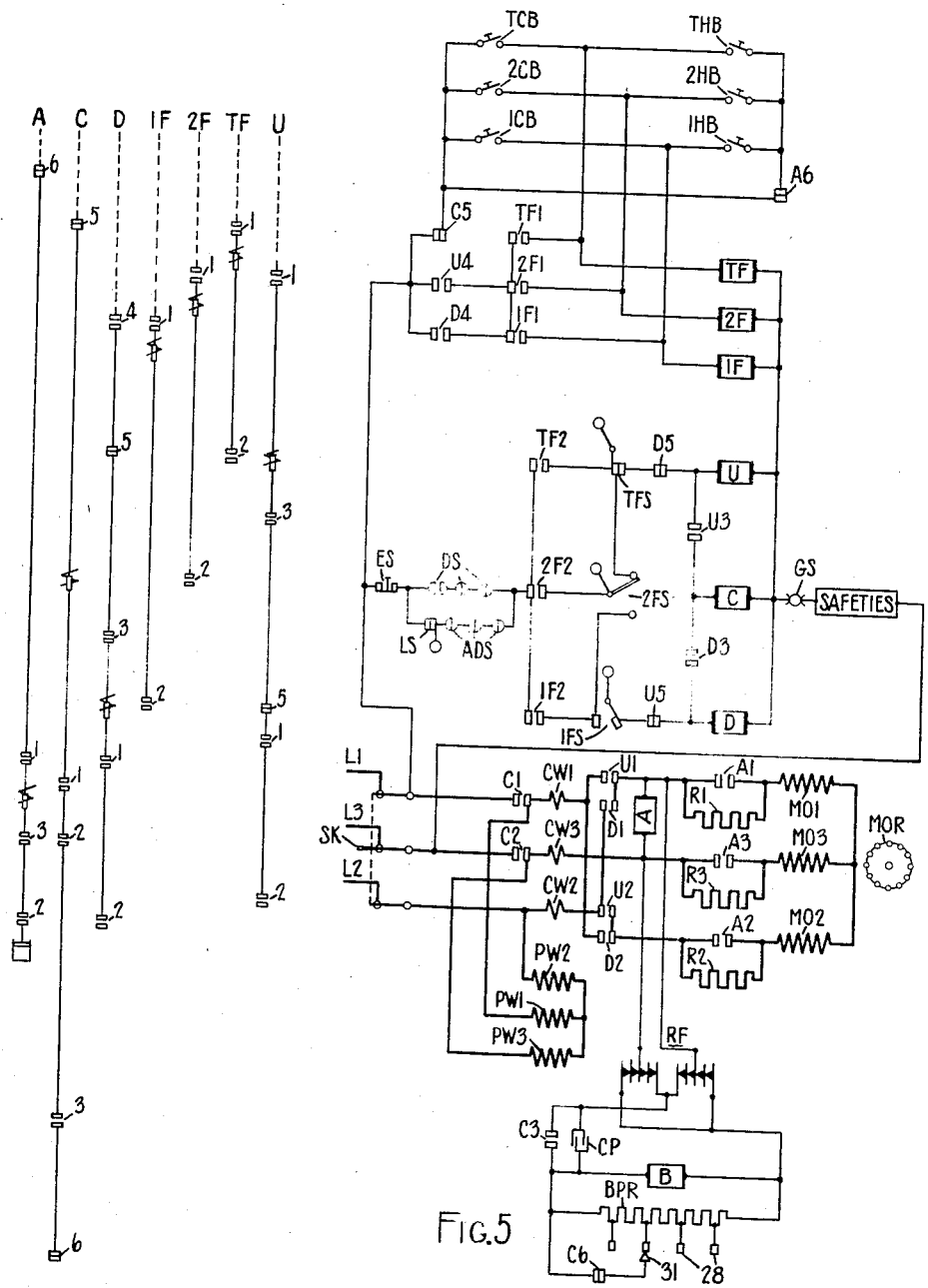

Patented Mar. 7, 1939

2,149,452

UNITED STATES PATENT OFFICE 2,149,452

ELEVATOR CONTROL MECHANISM

Jacob Daniel Lewis and Otto Albert Krauer, Yonkers, N. Y., assignors to Otis Elevator Company, New York, N. Y., a corporation of New Jersey Application December 18, 1937, Serial No. 180,504

10 Claims. (Cl. 172—152)

The present invention relates to the control of elevator cars and especially to controlling the car so as to obtain accurate stops.

There are various factors in elevator operation which affect the accuracy of stopping of the car at the landings. Among these are the speed at which the car is travelling, the direction of travel of the car, the position of the car in the hatchway, the load being carried by the car, friction, the retarding force employed and the distance of the car from the landing at the time a reduction in speed is initiated. The load carried by the car, the direction of travel of the car and its position in the hatchway and friction are all factors which determine the net load on the hoisting motor. The net load on the hoisting motor may in turn influence the speed of the car to cause it to run at a higher speed when the net load is negative than when the net load is positive. The greater the net load on the hoisting motor the less the retarding force to bring the car to a stop in a given distance or, with a constant retarding force, the less the distance to bring the car to a stop.

The invention is directed to compensating for the effect of factors variably affecting the accuracy of stopping of an elevator car and involves first a measurement of these factors and then correction in accordance with the measurement obtained.

The retarding force required to bring the car to an accurate stop in a given distance with varying loads is not in direct proportion to the net load on the hoisting motor. It may vary considerably, depending upon the character of the particular installation. Similarly, the distance required to bring the car to an accurate stop with a constant retarding force is not in direct proportion to the net load on the hoisting motor. It too may vary considerably, depending upon the character of the particular installation. It is important that these variations be taken into account if accurate stops are to be insured.

One feature of the invention is the provision of mechanism controlled by the load on the hoisting motor which is positive and reliable in operation and which, for any given net load on the hoisting motor, insures the same control of the retardation of the motor each time the motor is subjected to that load.

Another feature of the invention is the provision of mechanism for controlling the retardation of the elevator car which is operable in accordance with the load on the hoisting motor and is proportioned to provide accurate stopping control for the various loads to which the hoisting motor is subjected.

Further features and advantages of the invention will be apparent from the following description and appended claims.

There are certain advantages in having a fixed stopping distance for the elevator car and varying the retarding force applied to bring the car to a stop in accordance with load conditions. The invention will be described as applied to such an arrangement.

The mechanism for measuring the net load on the elevator hoisting motor is preferably electromagnetically operated and is controlled by the load on the motor. In carrying out the invention, according to an embodiment of the invention illustrated for purposes of description, this mechanism is arranged to operate switching mechanism to control the retardation of the elevator car. Thus, at the time the car reaches the fixed stopping distance from a landing, the switching mechanism has a definite setting, determined by the load on the hoisting motor, so that by controlling the retardation in accordance with this setting an accurate stop is made regardless of load.

The invention is of particular application in slow speed elevator installations ranging say from fifty to one hundred and fifty feet per minute car speed, in which a polyphase alternating current motor is employed to raise and lower the car. In such an installation it is usual to slow down and stop the car simply by discontinuing the supply of current to the hoisting motor and applying the electromechanical brake. The invention will be described as embodied in such an installation.

In carrying out the invention as applied to such installation, the retarding force for bringing the car to a stop at the landing is varied by varying the force of application of the electromechanical brake. The application of the brake is controlled in such way that it is quickly applied when the hoisting motor is subject to maximum negative load, and more gradually applied as the load on the hoisting motor increases. In the arrangement shown, a direct current brake is provided and the switching mechanism controlled by the load on the motor in turn controls the amount of discharge resistance across the brake release coil. This resistance is arranged in a plurality of steps and by adjusting the amount of resistance in the various steps an accurate control of retardation is obtained for all loads.

An exact measurement of the net load on the hoisting motor of a polyphase alternating current installation is obtained by measuring the power applied to the motor, that is, the product of the current supplied to the motor, the voltage applied thereto and the power factor. The power factor itself, within the range of loads to which the hoisting motor is subjected, varies in accordance with the load. Advantage is taken of this fact, in carrying out the invention. According to the preferred arrangement, a polyphase induction motor with a wound stator and a wound rotor is connected so that one of these is subject to the current supplied to the hoisting motor and the other to the voltage applied thereto. This provides two rotating fields with a phase relationship determined by the load on the hoisting motor. This causes the rotor to move to and electromagnetically lock in a position with the two rotating fields in phase, a strong torque being developed to insure for any given load the rotor assuming the same position every time the hoisting motor is subject to that load. Such arrangement provides an exact measurement of the power factor of the hoisting motor and thus a positive indication of the load on the hoisting motor. By proper adjustment of the retardation for different load indications, accurate stops are insured regardless of load.

In the drawings:

Figure 2 is a side view of the load compensating mechanism, parts being shown broken away;

Figure 3 is an end view of the same, also with parts broken away;

Figure 4 is a detail taken along the line 4—4 of Figure 3;

Figure 5 is a simplified wiring diagram of the power and control circuits employed to illustrate the operation of the invention; and Figure 5a is a key diagram for Figure 5 showing the electromagnetic switches in spindle form with the contacts and coils arranged on the spindles in horizontal alignment with the corresponding contacts and coils in the wiring diagram.

Figure 1:
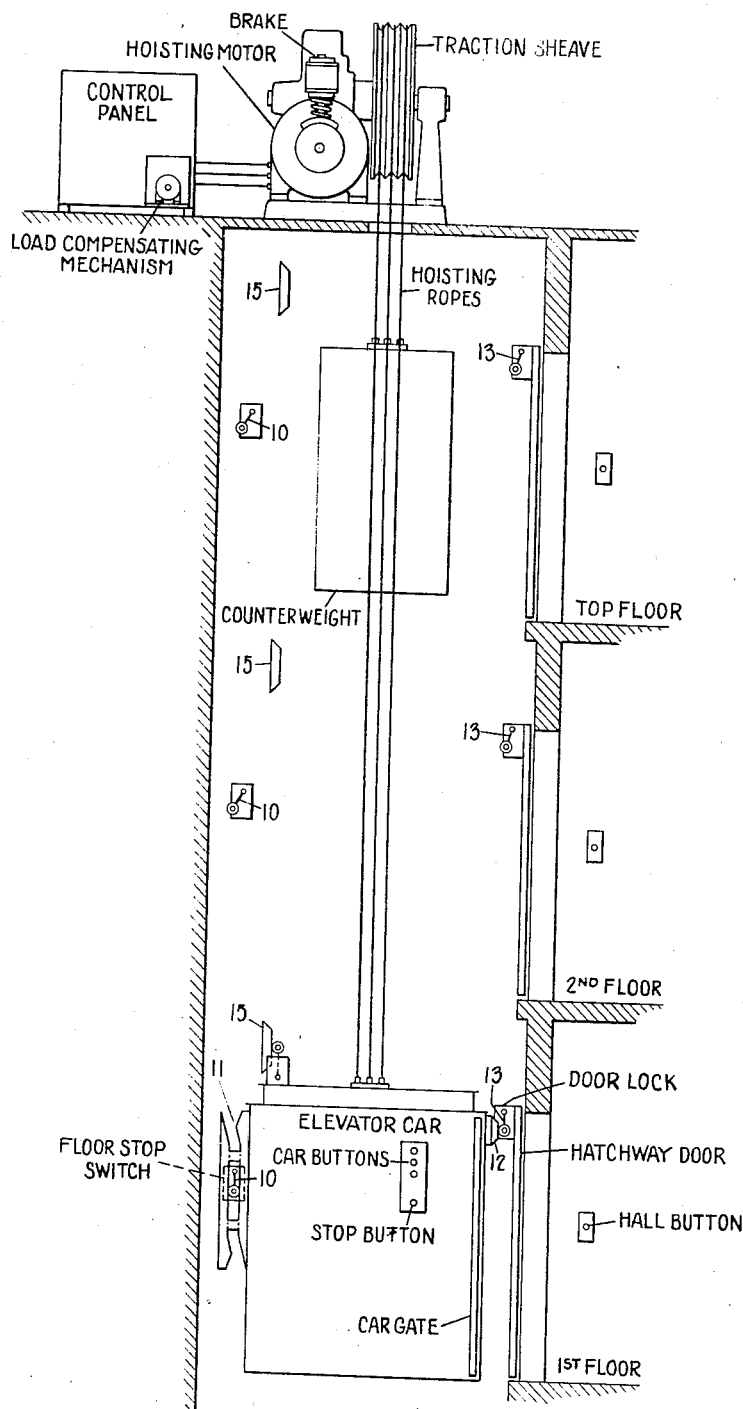
Figure 1 is a schematic representation of an elevator installation illustrating suitable mechanism for use in carrying out the invention.

Referring to Figure 1 wherein the parts of the system are indicated by legend, the hoisting motor for the elevator car drives a traction sheave over which pass the hoisting ropes of the car and counterweight. A geared machine is illustrated. The electromechanical brake for the hoisting motor acts on a brake drum driven by the motor shaft.

For illustrating the principles of the invention, a control system will be described in which the stopping of the car at the various floors is automatic. A push button control system is illustrated wherein a car button is provided in the car for each floor for operation by the passengers in the car and a hall button is provided at each floor for operation by intending passengers. A stop button is also provided in the elevator car.

Mechanism actuated in accordance with car movement is utilized in such system. This mechanism has been illustrated as comprising a plurality of floor stop switches in the hatchway, one for each landing. Each switch is provided with an operating arm 10 on the end of which is a roller adapted to be engaged by a slotted cam 11 carried by the car. When the car is stopped at a floor, the car being shown stopped at the first floor, the operating arm of the switch for that floor is held by the slotted cam in neutral position. As the car leaves the floor in the upward direction, the cam moves the arm into an operative position on the right hand side of neutral. Similarly, when the car leaves an upper floor in the down direction, the cam moves the arm of the corresponding floor stop switch to the operative position on the other side of neutral. As the car arrives at a floor, the operating arm of the switch for that floor is moved from operative position to neutral, causing the opening of the switch at stopping distance from the floor level. This causes the car to be retarded at a rate determined by the load compensating mechanism so as to be brought to an exact stop at the landing.

Horizontally sliding car gate and hatchway doors have been indicated. A door lock is indicated for each of the hatchway doors. A fixed cam 12 is carried by the elevator car for operating the door lock at the floor at which the stop is made, each door lock being provided with an operating arm 13 upon which a roller is mounted in position to be engaged by the cam. A landing switch LS is carried by the elevator car for operation by cams 15 in the hatchway, one for each floor. This switch is arranged in connection with auxiliary door contacts to by-pass the door lock contacts after the door lock cam disengages the door lock operating roller as the car moves away from the floor.

The load compensating mechanism for controlling the retardation of the hoisting motor is illustrated as arranged on the control panel provided for the various electromagnetic switches of the control system. This mechanism is shown in Figures 2, 3 and 4 of the drawings. It comprises a load indicating motor 20 mounted on a base 21. As will be seen from a description of the wiring diagram, this motor has a polyphase stator winding connected in series with the stator winding of the elevator hoisting motor. It also has a polyphase rotor winding connected across the elevator motor stator winding. The motor is wound to provide two poles. The rotor of the load indicating motor moves only a fraction of a revolution. Thus, instead of effecting the connecting to the rotor through slip rings, the leads 22 from the rotor are led through apertures into a hollow portion 23 of the rotor shaft 24, from which they are taken through flexible conduit 25 to terminal studs. To allow for the twist of the wires due to turning of the rotor, this conduit is bent back upon itself and led to the other end of the motor before the rotor leads are connected to the terminals.

A vertical plate 26 is secured to the end of the motor frame opposite the end from which the rotor leads are taken. Upon this plate is secured an arcuate mounting segment 27 of insulating material for a plurality of stationary contacts 28. This segment may be formed by moulding with the contacts secured therein in the moulding process. The segment is positioned so that its center of curvature is coincident with that of the load indicating motor shaft. The segment is of such length that it extends over an angle slightly more than ninety degrees. Upon the end of this shaft is an operating lever 30 upon the end of which is carried a pair of oppositely disposed contact springs 31 for engaging the stationary contacts 28. This lever is split from one end into the aperture through which the motor shaft 24 extends and is secured to the shaft by means of a screw 32 which clamps together the two arms 33 and 34 formed by the split.

The contact springs 31 are mounted on arm 33. These springs are secured to an extension 35 of insulating material mounted on arm 33. The end of extension 35 is bevelled to receive the contact springs, the springs being secured to the extension by means of screw 36. Spring clips are arranged between the springs and the head of the screw and securing nut to insure the contact springs being held in place. The contact springs are arranged on opposite sides of the stationary contacts 28 and are provided with contact tips 37, preferably of silver, for engaging the opposite sides of the stationary contacts. With this arrangement, the contact springs are insulated from the lever, screw 36 also serving as a terminal to which a flexible lead 38 is secured. The other end of this lead is connected to a stationary terminal stud 40 arranged on plate 26.

In order to dampen the clockwise movement (as viewed in Figure 3) of the rotor, the other end of lever 30 is connected to a dash-pot 42. This dash-pot is mounted on a plate 43 secured to a lip 44 formed on plate 26. The dash-pot comprises a cylinder 45 and piston 46, each of which may be of a moulded phenolic compound impregnated with graphite. On the top of the cylinder is a passage 47. Moulded within this passage is an internally threaded metallic bushing 48 into which is threaded a valve 50 locked in place by means of a lock nut 51. The valve comprises an elbow 52 through which an aperture 53 extends. The lower end of this aperture is threaded to receive an adjusting screw 54, one side of which is provided with a slot 55. An aperture 56 also extends through the center of this screw and the upper end of this aperture is formed to provide a seat for a check ball 57. This ball seats upon upward movement of the dash-pot piston to prevent downward flow of air through aperture 56. However, a certain amount of air is permitted to escape through slot 55 in screw 54. The amount of air which flows by way of slot 55 and thus the amount of retardation of the upward movement of the dash-pot piston is determined by the adjustment of this screw. A lock nut 58 is provided on the screw for locking it in adjusted position. Upon downward movement of the dash-pot piston, the ball 57 lifts off its seat to permit free passage of air through the apertures into the top of the dash-pot cylinder, thereby permitting substantially unrestricted downward movement of the dash-pot piston.

A spacing ring 59 is arranged between the dash-pot cylinder and plate 43. A spring 60 is arranged between plate 43 and the piston 46 of the dash-pot, the piston being recessed to receive the spring. A connecting rod 61 pivotally connects the dash-pot piston with the end of lever 30. A weight 62 is adjustably mounted on a screw 63 secured to arm 34 of lever 30 and a lock nut 64 is provided for locking the weight in adjusted position. This weight acts together with spring 60 to counterbalance the weight of the dash-pot piston and connecting rod and is adjusted so that the lever will remain in any position to which it is moved.

The stationary contacts 28 of the load compensating mechanism are connected to sections of the discharge resistance for the electromechanical brake. This discharge resistance is illustrated in the form of resistance tubes 70 arranged between the sides of a U-shaped bracket 71 mounted at one end on plate 43 and at the other end on the lip 72 of a plate 73 secured to the motor frame. Four of these resistance tubes are illustrated and they are of the same construction. Each tube is secured to bracket 71 by an elongated screw 74 provided with a nut 75 which clamps the barrel 76 of the tube against one wall of the bracket. The other end of the screw is provided with a collar 77 which extends through an aperture 78 on the opposite wall of the bracket. The barrel is of insulating material and has a helical groove formed thereon in which resistance wire 80 is wound. At each end of the tube is a terminal strap 81 to which the corresponding end of the resistance wire is connected. A screw 82 clamps the strap to the tube and also serves as a connector. The strap at one end of one of the tubes is connected by conductor 83 to a terminal stud 84. The strap at the other end of that tube is connected by conductor 86 to the strap at the end of another tube. The strap at the other end of this other tube is connected in turn to the strap at the end of a third tube and the strap at the other end of this third tube is connected to the strap at one end of the fourth tube, thereby connecting all the tubes in series relation to stud 84. The strap at the other end of the fourth tube is connected to another terminal stud, not shown, similar to the connection to stud 84.

On each tube is arranged a plurality of adjustable spring contact clips 87 to provide steps of adjustment of the brake discharge resistance. These clips are U-shaped and the outer end of one leg of each clip is provided with a connecting stud 88. The stationary contacts 28 are individually connected to these clips. Enough stationary contacts are shown for forty-one steps of adjustment of the discharge resistance. With this number of stationary contacts, forty-one clips may be arranged on the tubes and connected to the stationary contacts. For convenience, however, but one clip is illustrated per tube. Beginning with the lowermost of the used stationary contacts 28 as viewed in Figure 3, which is connected to the contact clip next to the right of the terminal strap 81 connected to stud 84, the succeeding used stationary contacts are connected to succeeding adjustable contact clips 87. This provides an amount of resistance between terminal studs 84 and 40 which is larger the higher the stationary contact engaged by contact springs 31. Conversely, the lower the stationary contact engaged by contact springs 31, the smaller the amount of resistance between these two studs. The number of stationary contacts used and thus the number of clips 87 employed depends upon the requirements of the particular installation. Also, the positions to which the clips are adjusted on the tubes depends upon the characteristics of the installation.

The wires 90 connecting the stationary contacts to the clips are soldered to the ends of the stationary contacts, alternate contacts being bent oppositely as indicated in Figure 4 to facilitate this connection. The connecting studs 88 of the clips are provided with rounded heads 91 for contacting the resistance wire on the tubes, the tubes being flattened along the line on which these terminal studs move to eliminate the helical groove and thus provide positive contact between the wire and the stud.

Terminal blocks 92 are secured to base 21, these terminal blocks having terminal studs 93 for connecting the stator and rotor windings of the load indicating motor in the system. A clip 89 is secured to plate 43 for supporting the connecting wires from the rotor to the terminal studs. The load compensating mechanism is provided with a cover 94 secured at the top to lips 95 formed along bracket 71. This cover is formed with louvers 96 to provide ventilation. The left hand end, as viewed in Figure 2, of the base 21 is bent upwardly and provided with openings to receive cable bushings 97 for the wires leading to the terminal studs. Feet 98 are provided on the bottom of the base for securing the mechanism to mounting brackets on the control panel.

Referring now to Figures 5 and 5a, the push button control system illustrated is for a three floor installation. It is a form of single call control which is particularly suitable for private residences. This system has been chosen because its simplicity facilitates a disclosure of the application of the invention.

The electromagnetic switches employed in this system are designated as follows:

A—Accelerating switch
    C—Potential switch
    D—Down direction switch
    1F, 2F, TF—Floor relays
    U—Up direction switch Throughout the description which follows these letters will be applied to the coils of the above designated switches. Also, with reference numerals appended thereto, they will be applied to the contacts of these switches.

The wiring diagram, Figure 5, is of the "straight" or "across-the-line" form in which the coils and contacts of the various switches are separated in such manner as to render the circuits as simple and direct as possible. The relationship of the coils and contacts of the various electromagnetic switches may be seen from Figure 5a, where the switches are arranged in alphabetical order and shown in spindle form. The position of these coils and contacts in the wiring diagram may be found by referring to Figure 5a, where the coils and contacts are positioned on the spindles in horizontal alignment with the corresponding elements of the wiring diagram. The electromagnetic switches are illustrated in deenergized condition.

The push buttons in the car, usually termed car buttons, are designated CB, while the push buttons at the landings, usually called hall buttons, are designated HB. In each case these designating letters are appended to a numeral or letter indicative of the floor for which the push button is provided. The floor stop switches are designated generally by the letters FS, these letters in each case being appended to a numeral or letter indicative of the floor for which the floor stop switch is provided. The contacts operated by the car gate are designated GS. Auxiliary door contacts operated by the hatchway doors and closed when the doors are closed are designated ADS. The door contacts operated by the hatchway doors and closed only when the doors are closed and locked are designated DS. The stop button is designated ES.

The polyphase supply lines are designated L1, L2 and L3. SK indicates a triple knife switch for controlling the connection of the power lines to the power and control circuits. The hoisting motor is a polyphase squirrel cage induction motor, the rotor being designated MOR and the stator windings MO1, MO2 and MO3. Starting resistances for the hoisting motor are designated R1, R2 and R3. The stator windings of the load indicating motor are designated CW1, CW2 and CW3, while the rotor windings of this motor are designated PW1, PW2 and PW3. The brake release coil is designated B. RF designates a rectifier for deriving direct current from the power supply lines for application to the brake release coil. BPR designates the brake discharge resistance for the brake release coil. CP designates a condenser connected across contacts C3 of the potential switch. Various safety devices are indicated by the legend "Safeties".

The circuits are illustrated for the condition with the car standing idle at the first floor. The position of the car is indicated by the condition of the floor stop switches, the floor stop switch 1FS for the first floor being open. The car gate and hatchway doors are closed, as indicated by the gate contacts GS and the auxiliary door contacts ADS being closed. The hatchway doors at the second and top floors are locked and the first floor hatchway door is unlocked. This is indicated by the door contacts DS for the first floor being shown separated and those for the second and third floors being shown closed.

Assume that an intending passenger at the first floor desires to be carried to the second. As the first floor hatchway door is unlocked, he may open the door and car gate and enter the car. The opening of the door and gate separates the first floor auxiliary door contacts ADS and gate contacts GS. Reclosure of the door and gate recloses these contacts. The pressing of the second floor car button completes a circuit from line L1 through contacts C5 of the potential switch, second floor car button 2CB, coil 2F of the second floor relay, gate contacts GS, safety devices, to supply line L3.

The second floor relay operates to engage contacts 2F2, completing a circuit from line L1 through stop button ES, landing switch LS, auxiliary door contacts ADS, contacts 2F2, second floor switch 2FS, top floor switch TFS, interlock contacts D5 of the down direction switch, coil U of the up direction switch and by way of gate contacts GS to line L3. Switch U upon operation engages contacts U4 to establish, through contacts 2F1 of the second floor relay, a holding circuit for this relay, permitting the second floor car button to be released.

Switch U separates interlock contacts U5 in the circuit for coil D. It engages contacts U1 and U2 to prepare a circuit for the stator windings of the elevator hoisting motor. It also engages contacts U3, completing a circuit in parallel with coil U and coil C of the potential switch.

The potential switch upon operation separates contacts C5, breaking the common feed to the push buttons, and separates contacts C6 to render contact springs 31 ineffective to short-circuit a portion of the brake discharge resistance BPR. It also engages contacts C1 and C2, completing the circuit for the stator windings MO1, MO2 and MO3 of the elevator hoisting motor through resistances R1, R2 and R3 respectively. This circuit also includes the stator windings CW1, CW2 and CW3 of the load indicating motor in series with the hoisting motor stator windings. The engagement of contacts C1 and C2 also connects the rotor windings PW1, PW2 and PW3 of the load indicating motor across the supply lines. It also engages contacts C3 to connect the brake release coil B across the output terminals of rectifier RF. The elevator motor stator windings being energized and the brake being released as a result of the energization of the brake release coil, the elevator motor starts. Owing to the phase rotation of the voltages applied to the stator windings due to the engagement of contacts U1 and U2, the hoisting motor rotates in a direction to move the car upwardly.

The engagement of contacts C1 and C2 of the potential switch also completes a circuit for coil A of the accelerating switch. This switch does not operate immediately, being delayed as by a dash-pot indicated in Figure 5a. Upon operation, this switch engages contacts A1, A2 and A3 to short-circuit starting resistances R1, R2 and R3, thereby applying full line potential to the stator windings of the hoisting motor. This switch also separates contacts A6, these contacts serving as time limit contacts controlling the circuit feeding the hall buttons.

As the car moves a certain distance away from the first floor, say eight inches, the door lock cam disengages the operating roller of the first floor door lock, effecting the engagement of the first floor door contacts DS and the locking of the door. As the car reaches another point say eleven inches from the floor, the roller of landing switch LS disengages the first floor cam, opening the switch and breaking the circuit through auxiliary door contacts ADS. This circuit, however, is now by-passed by the door contacts DS.

As the car arrives at stopping distance from the second floor, the contact blade of the second floor switch 2FS disengages its upper contact, breaking the circuit for coils U and C of the up direction switch and potential switch respectively. These switches drop out, separating contacts U1, U2, C1 and C2 to disconnect the elevator motor stator windings and the windings of the load indicating motor from the supply line and to separate contacts C3 to disconnect the brake release coil B from across the rectifier terminals. The application of power to the hoisting motor being thus discontinued and the brake being thus applied, the elevator car is slowed down and finally brought to a stop at the second floor landing.

Contacts C6 are set to engage at the same time contacts C3 open, so that at the instant the brake release coil is disconnected from the rectifier a short-circuit is established for a portion of resistance BPR. The amount of resistance short-circuited and thus the amount which remains effective as a discharge path for the brake release coil to determine the rate of application of the brake is predetermined by the load indicating motor.

Condenser CP is connected across contacts C3 to prevent the formation of any arc across these contacts as they open, thus obviating any uncertainties in timing due to arcing. The brake discharge resistance BPR also serves as a protection for the condenser against breakdown. Opening of the circuit to contact springs 31 by contacts C6 during the time that the brake is connected across the rectifier prevents the connection of resistance of low value across the rectifier, as when the elevator hoisting motor is lifting full load.

The up direction switch, upon dropping out, also separates contacts U4 to break the holding circuit for the second floor relay 2F and the potential switch C reengages contacts C5 in a circuit common to the push buttons. The hall buttons are maintained ineffective, however, by contacts A6, which are delayed in dropping out by the dash-pot upon the deenergization of the elevator hoisting motor. This time is sufficient to enable the passenger in the car to open the car gate and hatchway door and leave the car. Upon the passenger opening the gate and door and leaving the car and the reclosure of the gate and door, the system is in condition to be operated in response to hall buttons as well as car buttons.

It is believed that the operation of the car in response to a hall button will be understood from the preceding description. It is also believed that the operation of the car in the down direction in response to a push button for a floor below the car will be understood from the preceding description, down direction switch D operating instead of up direction switch U.

The windings of the load indicating motor are energized upon the closure of the potential switch each time the car starts. The stator windings CW, being connected in series with the hoisting motor stator windings MO, are subject to the current supplied to the hoisting motor. Thus the stator windings of the load indicating motor serve as current windings and are wound with few turns. The rotor windings, on the other hand, being connected across the power supply lines, serve as potential windings and are wound with a large number of turns. The load indicating motor windings are connected in such way that the field due to the stator winding and that due to the rotor winding rotate in the same direction, namely in a clockwise direction as viewed in Figure 3. These windings are outside the contacts of the direction switches in the circuit for the hoisting motor. Thus, a reversal of the direction of car travel does not change the direction of rotation of either field.

Referring again to Figures 2, 3 and 4, assume that the lever 30 of the load weighing device has been adjusted to the proper radial position on the shaft of the load indicating motor, the manner in which this adjustment is made being explained later. The angular position of this lever and therefore the stationary contact 28 which is engaged by contact springs 31 at the time that the car starts is determined by the net load to which the hoisting motor was subjected during the last operation of the car. Therefore, with the car at rest, an arbitrary position of the contact springs 31 with respect to stationary contacts 28 may be assumed. For convenience, in the wiring diagram (Figure 5) only four of the stationary contacts 28 are indicated and contact springs 31 are indicated as a single movable contact or brush for engaging the stationary contacts. The brush is shown engaging the second from the left one of the stationary contacts. It will therefore be assumed that the brush is in that position with the car stopped at a floor.

Upon the circuits for the elevator hoisting motor being established to start the car, the current and potential windings of the load indicating motor are simultaneously energized. Owing to the starting characteristics of high starting torque motors used as elevator hoisting motors, and further due to the starting resistances being included in the circuit, the power factor of the supply lines is high at the instant the circuit is established. This means that the current supplied to the hoisting motor and thus the current flowing through load indicating motor stator windings lags behind the applied voltage only by a small angle. This creates a rotating field in the stator which is ahead in space of that developed in the rotor, causing the rotor to be pulled clockwise into position where the currents in the two windings are in phase. The dash-pot connected to lever 30 dampens the clockwise movement of the rotor to prevent its being carried by inertia considerably beyond this position. The rotor therefore is moved to and locked in position where its rotating field is in phase with that of the stator.

The current supplied to the hoisting motor gradually increases its lag behind the applied voltage as the hoisting motor comes up to speed, this action being augmented by the short-circuiting of the starting resistances by accelerating switch A. The rotating field due to the rotor being locked to the rotating field of the stator, the rotor is thus gradually pulled counterclockwise as the increase in speed of the hoisting motor takes place. When the hoisting motor comes up to full speed the rotor has returned to a certain position, determined by the net load on the hoisting motor. If the hoisting motor is lowering full load, for example, the rotor may return to a position where the lever 30 is in position somewhat as shown in Figure 3 or where brush 31 is engaging the left hand one of contacts 28 as viewed in Figure 5, whereas if the hoisting motor is lifting full load, the rotor may return only a slight amount, say to the position where brush 31 engages the right hand one of contacts 28 as viewed in Figure 5. In other words, the greater the net load on the hoisting motor, the less the amount of return of the rotor and therefore the less the amount of discharge resistance to be connected across the brake release coil.

After the car has come up to full speed and at the instant before the hoisting motor is disconnected from the supply lines, as the car approaches a landing at which a stop is to be made, brush 31 is in a certain position with respect to the stationary contacts 28. When this disconnection occurs, the load indicating motor is also deenergized so that no torque is exerted to change the position of brush 31 with respect to the stationary contacts. Therefore the discharge resistance which is connected across the brake release coil upon initiation of the stopping operation is determined by the net load on the hoisting motor. Inasmuch as this resistance is of low value, when the hoisting motor has been lifting a heavy load, the current in the discharge circuit and therefore the field of the brake is sustained, causing a very gradual brake application, gravity assisting in bringing the car to a stop. Conversely, since the discharge resistance is of a relatively high value when the motor has been lowering a heavy load, the current in the brake release coil and therefore the field of the brake dies out very rapidly, causing a quick application of the brake, gravity in this case opposing the stopping of the car. For net loads in between lifting full load and lowering full load, the decrease in the amount of brake discharge resistance as the net load increases results in more gradual application of the brake so that by proper adjustment accurate stops are made at the landings regardless of load.

The position of lever 30 on the shaft of the load indicating motor may be set by connecting non-inductive resistance instead of the stator of the hoisting motor in series with the stator windings of the load indicating motor with this resistance of a value such that full load running current is obtained. This causes the rotor to assume a certain locking position. The lever is then clamped on the motor shaft in position where the contact springs 31 engage a lower one, say the third from the bottom as viewed in Figure 3, of the stationary contacts 28. With this setting and with the hoisting motor connected back in circuit, the contact springs 31, upon the rotor assuming locking position under conditions where the hoisting motor is lifting full load and where the hoisting motor is lowering full load should engage contacts 28 which are approximately equidistant from the lowermost and uppermost contacts respectively. If not, a readjustment may be made of the position of lever 30 on shaft 24 to obtain this condition.

With this adjustment made, the brake discharge resistance BPR may now be adjusted to obtain accurate stops. It is preferred to adjust for certain load increments and to make the settings for other loads by approximation. The brake spring pressure is first adjusted so that, with all the brake discharge resistance short-circuited, the car stops slightly above the floor when running up with full load, and with all the discharge resistance connected across the brake coil the car stops slightly above the floor when running down with full load. The brake discharge resistance is then adjusted so as to provide accurate stops in both directions with full load in the car, with eighty percent fulll oad in the car, with sixty percent full load in the car, and with balanced load (approximately forty percent full load). The adjustment in each case involves adjusting the spring contact clip 87 connected to the stationary contact 28 engaged by contact springs 31 for the particular load and direction for which adjustment is being made to provide the proper amount of brake discharge resistance to cause an accurate stop. After these seven settings have been made, the clips connected to stationary contacts 28 between those engaged by contact springs 31 for the above loads, are adjusted to divide proportionately or into equal portions the brake discharge resistance connected between the adjacent contacts which were engaged by the contact springs in the above seven load increments. This gives satisfactory adjustment for all load conditions but a different number of load steps may be employed in making the adjustments if desired. Also, adjustments may be made in a similar manner for overload conditions in both directions if desired.

It is to be understood that various changes may be made in the particular arrangement shown and specifically described. For example, instead of controlling the rate of application of the brake, the time at which the brake is applied may be controlled as by controlling the deenergization of the brake by a time relay, the excitation of which is controlled by the load indicating motor. Such a scheme could be used also in conjunction with a brake supplied with alternating current. Details of construction of the load indicating mechanism may be varied. Other forms of load indicating or measuring mechanism may be utilized to control the rate of brake application. The load indicating motor may be employed to control other retarding arrangements for the hoisting motor in which a plurality of steps of adjustment of retardation may be utilized. Also, the load indicating motor may be utilized to control the point at which slow down is initiated, either directly or in conjunction with a time relay arrangement such as above described.

Although the invention has been described as applied to a three phase alternating current elevator installation, it is applicable to installations of other numbers of phases. Certain features, such as the adjustment of the brake discharge resistance, are applicable to direct current installations. A slow speed installation has been chosen to illustrate the principles of the invention and, although the invention is particularly applicable to such installations, it is also applicable to higher speed installations. Also, although a single call push button control system has been described, it is to be understood that the invention is applicable to other forms of push button control and to systems controlled in other ways such as those in which the starting of the car is under the control of an attendant in the car with slow down controlled by passengers and intending passengers themselves, those in which both starting and slow down are under the control of a car attendant, with the slow down initiated automatically after movement of the control switch in the car to a certain position, or those in which both starting and slow down are controlled directly by the car attendant.

Thus it is apparent that many changes and many apparently widely different embodiments of the invention may be made without departing from the scope thereof and it is therefore intended that all matter contained in the above description or shown in the accompanying drawings shall be interpreted as illustrative and not in a limiting sense.

What is claimed is:

1. In combination; an elevator car adapted to serve a plurality of landings; a polyphase induction motor for raising and lowering the car; a source of polyphase alternating current for said hoisting motor; means for slowing down and stopping the car at the landings; and means responsive to the power factor of said motor under various load conditions for controlling the retardation.

2. In combination; an elevator car adapted to serve a plurality of landings; a polyphase induction motor for raising and lowering the car; a source of polyphase alternating current for said hoisting motor; means for slowing down and stopping the car at the landings, said means comprising resistance arranged in a plurality of adjustable steps for controlling the retardation; and a load indicating motor having a polyphase stator winding subject to the current supplied to the hoisting motor and a polyphase rotor winding subject to the voltage applied to the hoisting motor for controlling the amount of said resistance which is effective.

3. In combination; an elevator car adapted to serve a plurality of landings; a polyphase induction motor for raising and lowering the car; a source of polyphase alternating current for said hoisting motor; means for slowing down and stopping the car at the landings, said means comprising resistance arranged in a plurality of adjustable steps for controlling the retardation; switching mechanism having a plurality of stationary contacts connected to said steps of said resistance and a movable contact for engaging said stationary contacts and connected for determining the amount of said resistance which is effective; and a polyphase load indicating motor for operating said movable contact, said load indicating motor having its stator winding connected so as to be subject to the current supplied to the hoisting motor and its rotor winding connected so as to be subject to the voltage applied to the hoisting motor, thereby causing the stationary contact engaged by said movable contact and therefore the amount of said resistance which is effective for retardation to be dependent upon the net load on the hoisting motor.

4. In combination; an elevator car adapted to serve a plurality of landings; a polyphase induction motor for raising and lowering the car; a source of polyphase alternating current for said hoisting motor; a direct current electro-mechanical brake for said motor; a source of current for the coil of said brake; a discharge resistance for said brake coil; switching mechanism having a plurality of stationary contacts connected to successive points on said resistance and a movable contact for engaging said stationary contacts and connected for short-circuiting an amount of resistance determined by the stationary contact engaged by said movable contact; a polyphase load indicating motor for operating said movable contact, said load indicating motor having its stator winding connected so as to be subject to the current supplied to the hoisting motor and its rotor winding connected so as to be subject to the voltage applied to the hoisting motor, thereby causing the stationary contact engaged by said movable contact to be determined by the net load on the hoisting motor; and means for causing deenergization of both said hoisting motor and said load indicating motor and of said brake upon the arrival of the car at a certain distance from a landing at which a stop is to be made, said movable contact remaining in engagement with the then engaged stationary contact so that the amount of effective discharge resistance connected across the brake coil during stopping and therefore the retardation effected by the brake is determined by the net load to which the hoisting motor was subjected.

5. In combination; an elevator car adapted to serve a plurality of landings; a polyphase induction motor for raising and lowering the car; a source of polyphase alternating current for said motor; means for slowing down and stopping the car at the landings; and means for controlling said slow down and stopping means, said last named means comprising, a plurality of stationary contacts, a movable contact for engaging said stationary contacts, a control motor having a polyphase stator winding of few turns with the phase windings thereof connected in series relation in the conductors leading to the hoisting motor stator winding, and a polyphase rotor winding of a relatively large number of turns with the phase windings thereof connected across said conductors whereby when said hoisting motor is operating said car the current in the stator winding of said control motor produces a rotating magnetic field of a phase dependent upon the phase relationship of said current to the applied voltage causing the rotor to be pulled to and locked in position where the rotating magnetic field produced by the current in said rotor winding is in phase with that of said stator, said movable contact being operable by said rotor and thus the stationary contact engaged by said movable contact being determined by the phase relationship of the current supplied to the hoisting motor with respect to the voltage applied thereto and thus by the net load on the hoisting motor.

6. In combination; an elevator car adapted to serve a plurality of landings; a polyphase induction motor for raising and lowering the car; a source of polyphase alternating current for said hoisting motor; a direct current electro-mechanical brake for said motor; a source of direct current for the coil of said brake derived from said polyphase source; switching means for controlling the energization of said hoisting motor and the release of said brake to start the car; a discharge resistance for said brake coil arranged in a plurality of adjustable steps; switching mechanism having a plurality of stationary contacts connected to said steps and a movable contact for engaging said stationary contacts and connected to said resistance for short-circuiting an amount of said resistance dependent upon the stationary contact engaged by said movable contact; a load indicating motor having a polyphase stator winding connected so as to be subject to the current supplied to the hoisting motor and a polyphase rotor winding connected so as to be subject to the voltage applied to the hoisting motor whereby when said hoisting motor is energized said rotor is held in a position determined by the net load on the hoisting motor; means operable by said rotor for operating said movable contact thereby causing the stationary contact engaged by said movable contact to be in accordance with the net load on the hoisting motor; and means operable upon the arrival of the car at a certain distance from a landing at which a stop is to be made for causing deenergization of both said hoisting motor and said load indicating motor and of said brake, said movable contact remaining in engagement with the stationary contact into engagement with which it was moved by said rotor so that the amount of effective discharge resistance connected across the brake coil during stopping and therefore the retardation effected by the brake is determined by the net load to which the hoisting motor was subjected, the steps of said discharge resistance being adjusted to provide retardation for different load increments to cause accurate stops at the landings.

7. In combination; an elevator car adapted to serve a plurality of landings; a polyphase induction motor for raising and lowering the car; a source of polyphase alternating current for said motor; means for slowing down and stopping the car at the landings; and means for controlling said slow down and stopping means, said last named means comprising, a polyphase load indicating motor having a wound stator and wound rotor with the stator connected in series with the hoisting motor and the rotor in parallel with the hoisting motor, a plurality of stationary contacts arranged in an arc on a center coinciding with the axis of rotation of the rotor of said load indicating motor, an arm secured to the rotor shaft, a pair of contact springs carried by said arm for engaging opposite sides of said stationary contacts, and means for retarding movement of said arm.

8. In combination; an elevator car adapted to serve a plurality of landings; a motor for raising and lowering the car; a source of current for said motor; means for slowing down and stopping the car at the landings; and means for controlling said slow down and stopping means, said last named means comprising, a load indicating motor connected to be subject to the power applied to the hoisting motor, a plurality of stationary contacts arranged in an arc on a center coinciding with the axis of rotation of the rotor of said load indicating motor, means mounting said contacts in spaced relation and insulated from each other with opposite sides of the main ends of the contacts exposed, an arm adjustably secured to the rotor shaft, a pair of contact springs carried by said arm for engaging said opposite sides of said stationary contacts, and a dash-pot connected to said arm for retarding movement of said contact springs in one direction of rotation of said rotor.

9. In combination; an elevator car adapted to serve a plurality of landings; a motor for raising and lowering the car; a source of current for said motor; means for slowing down and stopping the car at the landings; and means for controlling said slow down and stopping means, said last named means comprising, a load indicating motor connected to be subject to the power applied to the hoisting motor, a plurality of stationary contacts arranged in an arc on a center coinciding with the axis of rotation of the rotor of said load indicating motor, means mounting said contacts in spaced relation and insulated from each other with opposite sides of the main ends of the contacts exposed, an arm adjustably secured to the rotor shaft, a pair of contact springs carried by said arm for engaging said opposite sides of said stationary contacts, a dash-pot connected to said arm for retarding movement of said contact springs in one direction of rotation of said rotor, and adjustable means for counterbalancing the dash-pot and arm to cause said contact springs to remain in engagement with the contact engaged thereby upon deenergization of said load indicating motor.

10. In combination; an elevator car adapted to serve a plurality of landings; a polyphase induction motor for raising and lowering the car; a source of polyphase alternating current for said motor; means for slowing down and stopping the car at the landings; and means for controlling said slow down and stopping means, said last named means comprising, a polyphase load indicating motor having a wound stator and wound rotor with the stator connected in series with the hoisting motor and the rotor in parallel with the hoisting motor, one end of the rotor shaft of the load indicating motor being provided with a longitudinal aperture extending inside the motor frame and three spaced apertures leading from said longitudinal aperture to the surface of the shaft adjacent the rotor, leads for the rotor winding extending through said apertures to the outside of the motor, a plurality of stationary contacts arranged in an arc on a center coinciding with the axis of rotation of the rotor of said load indicating motor, an arm secured to the rotor shaft, and contacting means carried by said arm for successively engaging said stationary contacts.

JACOB DANIEL LEWIS.
OTTO ALBERT KRAUER.